United States Patent [19]

Diehl et al.

[11] Patent Number: 5,264,694
[45] Date of Patent: Nov. 23, 1993

[54] OPTICAL IMAGING SYSTEM WITH A PLURALITY OF IMAGE PLANES

[75] Inventors: Hermann Diehl, Grünwald; Franz Müller, Sauerlach-Arget, both of Fed. Rep. of Germany

[73] Assignee: Messerschmitt-Bölkow-Blohm GmbH, Ottobrunn, Fed. Rep. of Germany

[21] Appl. No.: 914,828

[22] Filed: Jul. 15, 1992

[30] Foreign Application Priority Data

Jul. 18, 1991 [DE] Fed. Rep. of Germany ....... 4123791

[51] Int. Cl.$^5$ .............................................. H01J 40/14
[52] U.S. Cl. ............................. 250/208.1; 358/213.28; 359/629
[58] Field of Search ................. 359/629, 636, 634; 250/208.1, 216; 358/213.28

[56] References Cited

U.S. PATENT DOCUMENTS 4,634,882  1/1987  Craine et al. ..................... 250/208.1
5,130,814  7/1992  Spencer ........................... 358/213.28

Primary Examiner—Edward K. Look
Assistant Examiner—F. Daniel Lopez
Attorney, Agent, or Firm—Anderson Kill Olick & Oshinsky

[57] ABSTRACT

In this optical imaging system the same object section is imaged by optical means on three spatially separate image planes. Surface sensors A, B, C of identical width which in turn comprise optoelectronic sensor elements arranged in the manner of a matrix are arranged in the three image planes at a distance from one another in parallel rows and are offset relative to one another from one row to the other. The three grids of surface sensors which are accordingly formed are offset relative to one another from one image plane to the other in such a way that the object section is detected without gaps by means of the surface sensors A, B and C during optical superposition. Thus, large surface area pictures with high resolution can be taken with the use of conventional surface sensors, e.g. of the CCD type. Due to the special arrangement of the surface sensors, three image planes with the corresponding optical means, e.g. three lenses or less than three lenses and additional beam splitter systems such as semipermeable mirrors or prisms, are sufficient.

3 Claims, 2 Drawing Sheets

OPTICAL IMAGING SYSTEM WITH A PLURALITY OF IMAGE PLANES

The invention is directed to an optical imaging system having a plurality of separate image planes in which, in each instance, there is a plurality of rectangular or square surface sensors which are arranged at a distance from one another and in turn comprise a number of optoelectronic sensor elements arranged in rows and columns, and having optical means which are adjusted or adjustable in such a way that they image the same object portion on every image plane.

Such an imaging system is known from DE-A1 34 28 325 which describes an imaging system which is also reusable for photogrammetric purposes and in which four optically parallel beam paths can be represented by means of four individual lenses. The four individual lenses are adjusted in such a way that the same object section is imaged in the four resulting image planes. In each of the four separate image planes, four square surface sensors are arranged at distances relative to one another which are smaller than their own width. These surface sensors can be CCD sensor blocks formed in the manner of a matrix from optoelectronic sensor elements. The quadruplicate groups of these surface sensors are offset relative to one another from one image plane to the other in such a way that the imaged object section is covered without gaps by the totality of surface sensors when the four image planes are optically superimposed. The cost in apparatus incurred by the use of four lenses is thus relatively high in this known imaging system. Moreover, due to the relatively small distances between the surface sensors, there is considerable overlapping in certain boundary or edge areas of the surface sensors so that image points situated in these areas are detected two or even three times in all by sensor elements of different image planes. Thus, there are considerably more sensor elements than would be needed for detecting the object section without gaps and without redundancy together with a correspondingly greater amount of image information to process.

The invention therefore has the object of providing an optical imaging system of the type indicated in the beginning which makes do with an apparatus-related cost which is reduced as far as possible and is as efficient as possible with respect to image evaluation.

This object is met according to the invention by the following characteristic features: there are only three separate image planes; surface sensors of identical width are arranged at a distance from one another in adjacent parallel rows in every image plane; the distances between the surface sensors within one row are greater than their width and are, at the same time, given by the sum of the widths of one of the surface sensors located in each of the two other image planes; the surface sensors in two immediately adjacent rows are offset relative to one another by more than their own width; the grids of surface sensors formed in this way are offset relative to one another from one image plane to the other in such a way that the imaged object section is detected without gaps by the totality of surface sensors when the image planes are optically superimposed.

Accordingly, the imaging system of the invention makes do with only three separate image planes. The respective optical means can be formed by three separate lenses or by less than three lenses and, additionally, by semipermeable mirrors or prisms. The lenses, and also the mirrors, if used, must be adjusted in such a way that the same object section is imaged in every image plane. The surface sensors arranged in parallel rows in the individual image planes are at distances from one another within the rows which are greater than their respective widths. At the same time, the surface sensors arranged in two immediately adjacent rows are offset relative to one another by more than their own width and thus do not contact one another and are arranged "on gaps" so to speak. This takes into account the fact that the surface sensors, which comprise e.g. $1000 \times 1000$ sensor elements arranged in lines and gaps in the manner of a matrix and have an outer border which is not provided with such elements, can not be placed adjacent to one another without gaps with respect to the optically sensitive surfaces in practical execution. Therefore, the statements made here respecting width and distances of the surface sensors refer to their optically sensitive surfaces containing sensor elements. Due to the mutual offsetting of the surface sensors in immediately adjacent rows, a grid of surface sensors arranged at regular intervals occurs in every image plane. The distances between the surface sensors within a row, apart from the fact that they are to be greater than their own width, are dimensioned in such a way that they correspond exactly to the sum of the widths of one of the surface sensors situated in each of the remaining two image planes. The grids of surface sensors produced in this way are offset relative to one another in the three image planes in such a way that the entire image surface is covered by surface sensors without gaps or overlapping when optically superimposed. The contents of the image are accordingly detected in their entirety with the lowest possible expenditure on sensor elements.

In practice, it is preferable that the surface sensors in all three image planes have the same width. In this case, it is advisable that the surface sensors located in two immediately adjacent rows be offset relative to one another by 1.5 times their width. However, it is not absolutely necessary that all surface sensors have the same width; rather, surface sensors of different widths can be used from one image plane to the other.

Embodiment examples of the invention are explained in more detail in the following with reference to drawings.

A conventional aerial camera, for example, has a picture ratio or image format of approximately $23 \times 23$ cm$^2$ with a resolution of e.g. 100 line pairs/mm, depending on the film which is used. A digital camera having the same resolution would then have to use e.g. a CCD surface sensor with $23,000 \times 23,000$ sensor elements arranged in a matrix. Such surface sensors are not available for the foreseeable future.

Figure 1:
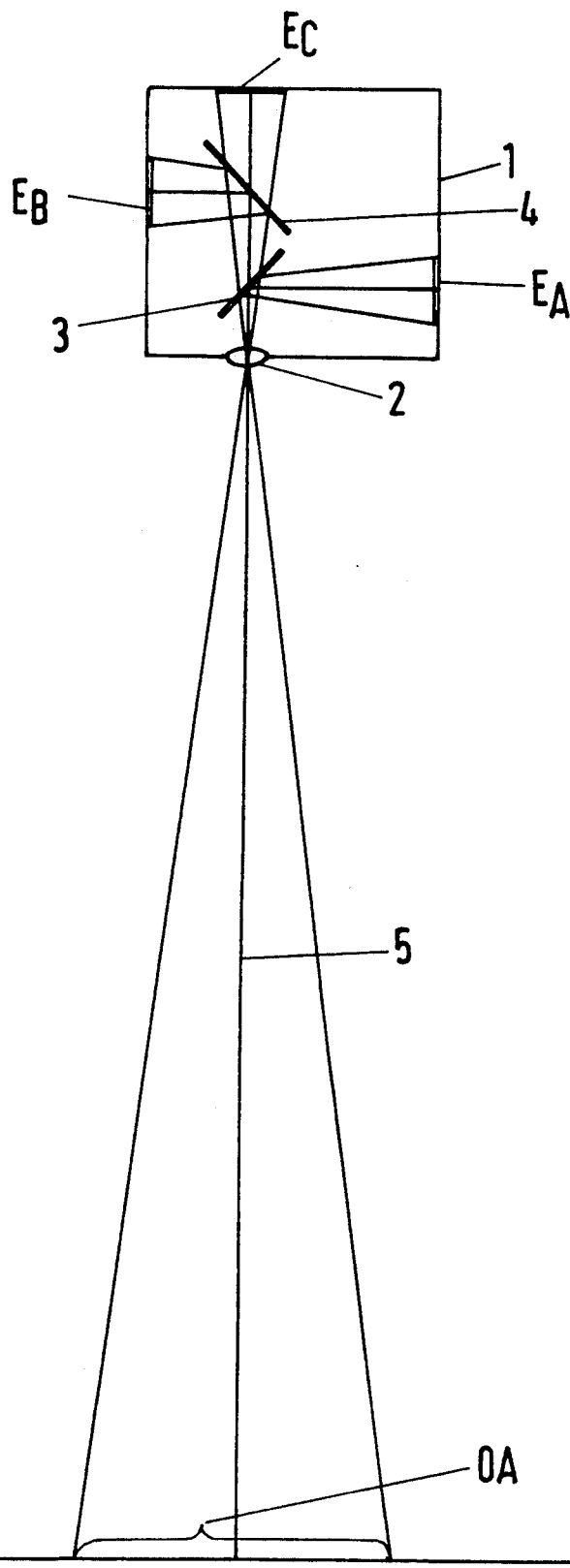
FIG. 1 shows an optical imaging system according to the invention in the form of a digital camera with a lens and two semipermeable mirrors.

A digital camera 1 according to FIG. 1 can be carried e.g. by aircraft or satellites for taking pictures of the surface of the overflown terrain. Of course, it can also be used for other recording purposes. It comprises a lens 2 and two semipermeable mirrors 3 and 4 arranged one after the other in the path of the beam. These mirrors 3 and 4 are advisably inclined at an angle of 45° relative to the optical axis 5. The semipermeable mirror 3 can be constructed e.g. in such a way that it lets through two thirds of the incident intensity and reflects one third, guiding it to the image plane $E_A$ associated with it. The second semipermeable mirror 4 can then advisably be constructed in such a way that it lets through one half of the incident intensity and reflects the other half. Two additional separate image planes $E_B$ and $E_C$ are associated with this second semipermeable mirror 4. The three image planes are covered by grid-like arrangements of surface sensors approximately corresponding to FIGS. 2a to 2c. These grids are offset relative to one another from one image plane to the other in such a way that the object section OA being imaged, e.g. a rectangular or square section of a planar terrain surface, is detected by the surface sensors of the three image planes without gaps as a whole, as will be made clear in the following.

Figure 2A:
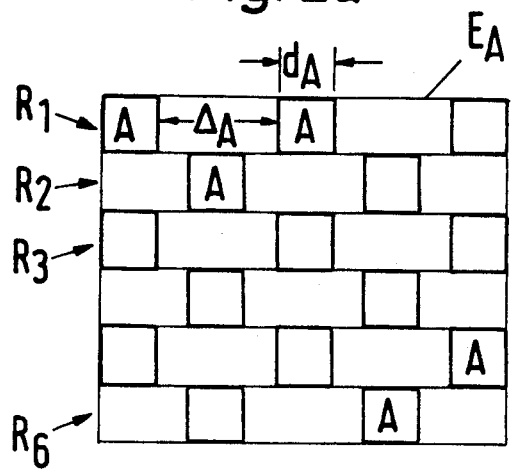
FIGS. 2a to 2c show an arrangement of surface sensors of the same width in three separate image planes.
Figure 2B:
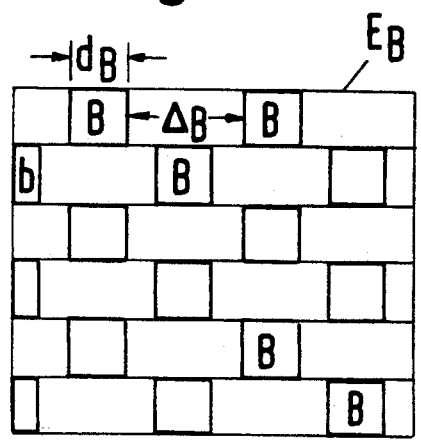
Figure 2C:
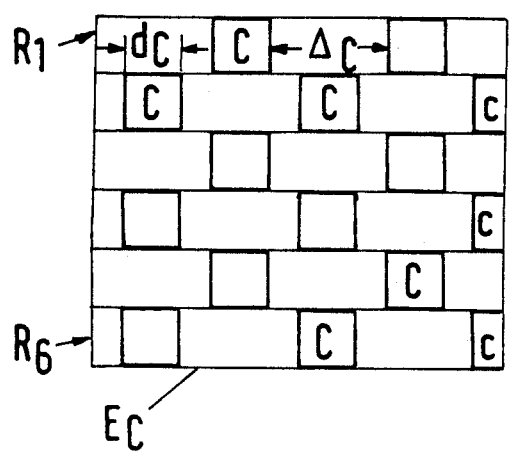

A possibility for the arrangement of surface sensors in three separate image planes which is preferred for its simplicity is indicated in FIGS. 2a to 2c. According to FIG. 2a, surface sensors A of identical width $d_A$ are arranged at equal distances $\Delta_A$ in a first image plane $E_A$ in immediately adjacent, parallel rows $R_1$ to $R_6$. The distances $\Delta_A$ of the surface sensors A equal twice their width $d_A$. This corresponds exactly to the sum of the widths $d_B$ and $d_C$ of the individual surface sensors B and C which are arranged in two additional separate image planes $E_B$ and $E_C$ according to FIGS. 2b and 2c. The surface sensors A are offset relative to one another in two directly adjacent rows, e.g. $R_1$ and $R_2$, by exactly 1.5 times their width $d_A$. Accordingly they are arranged "on gaps" and their corners have a sufficient distance from one another so that there is also no mutual interference of the optically insensitive edges of the individual surface sensors A which enclose the shown surfaces and are not shown in the drawing.

In FIG. 2a, it is indicated in the surface sensor at the upper right-hand corner that this surface sensor, as well as all the others (A, B, C, b, c; D, E, F, e, f), in turn also comprises optoelectronic sensor elements S, e.g. of the CCD type, which are arranged in the manner of a matrix, i.e. in lines and gaps.

In FIGS. 2b and 2c there are also surface sensors b and c in an edge region of the image planes $E_B$ and $E_C$ shown in the drawing. These surface sensors b and c serve only to complement the entire usable image surface to form a complete rectangle when the three image planes are optically superimposed according to FIG. 2d.

Figure 2D:
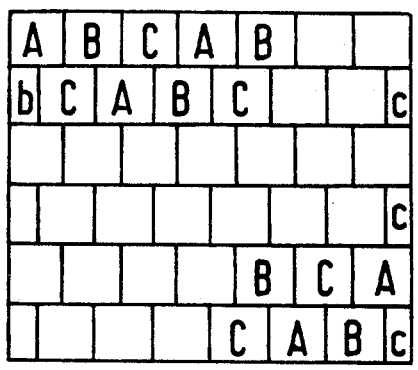
FIG. 2d shows the optical superposition of the grids of surface sensors according to FIGS. 2a to 2c.

FIG. 2d shows the optical superposition of the three image planes $E_A$ to $E_C$ shown in FIGS. 2a to 2c. The three grids of surface sensors A, B, C merge with one another without gaps or overlapping in such a way that the image of the object section OA is divided without gaps into image elements which are alternately associated with surface sensors A, B, C and b and c of the three different separate image planes. To achieve such a covering without gaps it is necessary to provide for a correspondingly exact positioning of the surface sensors in the individual image planes at the inner walls of the camera 1 and for an exact adjustment of the semipermeable mirrors.

Figure 3:
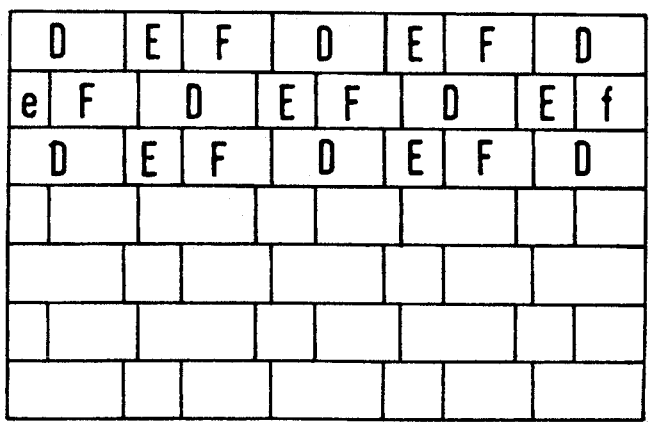
FIG. 3 shows the optical superposition of three grids of surface sensors of different widths.

FIG. 3 illustrates an example showing that the surface sensors to be arranged in the three separate image planes need not have the same width. The optical superposition of three image planes is shown. Surface sensors D are arranged in the first of these image planes, surface sensors E and e are arranged in the second image plane, and finally surface sensors F and f are arranged in the third image plane, specifically according to the distribution given in FIG. 3. The surface sensors D, E and F have the same widths and also meet the rest of the requirements to be realized in the invention with respect to the widths and distances.

In its entirety, the invention provides the possibility of taking digital, large surface area pictures with high resolution at a cost in optoelectronic sensor elements and optical auxiliary means which is reduced to the greatest possible extent. The sensor elements are preferably CCD sensors which can be read out in a conventional manner.

The process described in the preceding as optical superposition primarily refers to the purely fictitious, i.e. imaginary, superposition of the three image planes, wherein the deflection of the beam paths by the semipermeable mirrors 3 and 4 can be negated conceptually and the image planes $E_A$ and $E_B$ accordingly "fall" on the image plane $E_C$, together with the grids of surface sensors A, B and C associated with them. In practice the total image is first assembled from the image point information of the surface sensors associated with the three separate image planes by electronic means in the course of the digital image evaluation.

We claim:

1. Optical imaging system having a plurality of separate image planes ($E_A$, $E_B$, $E_C$) in which there is a plurality of rectangular or square surface sensors (A, B, C) which are arranged at a distance from one another and in turn comprise a number of optoelectronic sensor elements (S) arranged in rows and columns and having optical means (2, 3, 4) which are adjusted or adjustable in such a way that they image a same object section (OA) on each of the image planes ($E_A$, $E_B$, $E_C$), characterized in that there are only three separate image planes ($E_A$, $E_B$, $E_C$), surface sensors (A, B, C) of the same width ($d_A$, $d_B$, $d_C$) are arranged at a distance from one another in adjacent parallel rows ($R_1$ etc.), distances ($\Delta_A$, $\Delta_B$, $\Delta_C$) between adjacent surface sensors within a row are greater than their width and are simultaneously given by a sum of widths ($d_A$, $d_B$, $d_C$) of one of the surface sensors located in each of the two other image planes, the surface sensors are offset relative to one another in two immediately adjacent rows by an amount greater than their own width, and grids of surface sensors formed in this way are offset relative to one another from one image plane to the other in such a way that the imaged object section (OA) is detected without gaps by the totality of surface sensors in optical superposition of the image planes.

2. Imaging system according to claim 1, characterized in that the surface sensors (A, B, C) of all three image planes ($E_A$, $E_B$, $E_C$) have the same width.

3. Imaging system according to claim 2, characterized in that the surface sensors (A, B, C) are offset relative to one another in two immediately adjacent rows by 1.5 times their width.

* * * * *